Patented Jan. 31, 1950

2,495,890

UNITED STATES PATENT OFFICE 2,495,890

RESINOUS CONDENSATION PRODUCTS FROM AN ALDEHYDE OR A KETONE AND AN N-ALKENYLARYLAMINE

Joseph D. Danforth, Grinnell, Iowa, assignor to Universal Oil Products Company, Chicago, Ill., a corporation of Delaware No Drawing. Application February 16, 1948, Serial No. 8,753

22 Claims. (Cl. 260—72.5)

This application is a continuation in part of my application Serial No. 658,205, filed March 28, 1946 and now abandoned.

The present invention relates to a process for the manufacture of resinous condensation products and to a new class of such products comprising the condensates formed by reacting a particular class of arylamines with organic compounds containing a carbonyl group and selected from the aldehydes and ketones. More particularly the invention concerns a new class of resinous products characterized as the condensates of N-alkenylarylamines with a carbonyl reactant selected from the group of compounds characterized as aldehydes and ketones including the aliphatic and cyclic members of such series, the cyclic members thereof comprising the naphthenic, aromatic and heterocyclic aldehydes and ketones. It is thus one object of the invention to prepare resinous materials containing alkylene substituted nitrogen groups.

A further object of this invention is to prepare a new class of resin-like products useful as accelerators in the vulcanization of rubber, as valuable additives in the manufacture of plastics, and as bodying materials in the production of drying oils, paints and varnishes.

In its broad aspects the present invention relates to a process for the production of a resinous product which comprises reacting an alkenylarylamine with an organic compound containing a carbonyl radical selected from the group consisting of the aldehydes and ketones at condensation reaction conditions.

A more specific embodiment of the present process for the production of resin-like condensates of wholly organic composition is represented by reacting equimolecular proportions of crotonaldehyde and N-butenylaniline at a temperature of from about 20° to about 35° C. and separating the resultant resinous product by mixing the resulting reaction mixture with water.

In another embodiment of the invention the reaction of a carbonyl reactant and an alkenylarylamine is carried out in the presence of an acidic catalyst to yield thereby a solid resinous product having thermoplastic properties.

Other specific embodiments relating to specified reactants and to procedures employed in effecting the condensation reaction and separation of the product will be described in greater detail in the following further description of the process.

It is generally known that primary arylamines, such as aniline, react under certain conditions with compounds containing a carbonyl radical such as aldehydes to produce resin-like materials, the properties of which are dependent upon the specific reactants employed in the condensation reaction by which such resins are formed. According to the present invention I have discovered that new and distinctive products ranging in physical properties from viscous liquids to hard brittle solid resinous products may be prepared from certain classes of the above reactants comprising an aldehyde and/or a ketone as one reactive component and an N-alkenylarylamine as the second reactive component.

The class of compounds herein referred to as the N-alkenylarylamines are defined structurally as the aromatic secondary amines and more particularly characterized as compounds containing an aromatic nucleus substituted on one of its nuclear positions by an amino radical having attached thereto on the nitrogen atom, an alkenyl group having the general formula: $C_nH_{2n-1}$, said latter alkenyl group representing the radical obtained by removal of two hydrogen atoms from the corresponding alkyl group. The members of this class of amines may be readily and conveniently prepared by the direct substitution of the alkenyl group into the amino radical of an aromatic amine. The present alkenylarylamine may be prepared for example, by reacting a conjugated diolefinic hydrocarbon containing the same number of carbon atoms per molecule as the alkenyl radical attached to the amino group of the resulting alkenylarylamine, with a mixture of metallic sodium and a primary aromatic amine. The diolefinic hydrocarbon utilizable in the reaction to form the alkenyl radical of the N-alkenylarylamine must necessarily be a conjugated diolefin and also contain at least four carbon atoms per molecule. Thus, butadiene, pentadiene, hexadiene, etc., comprise suitable diolefins of this class of reactants. It is to be emphasized, however, that other N-alkenylarylamines having alkenyl radicals of shorter chain length than the butenyl group may be utilized herein, and these may be synthesized by means recognized by the art other than the above condensation-type reaction between a diolefin and a primary aromatic amine. The primary aromatic amines utilizable in the preparation of the N-alkenylarylamines according to the process described above include the mono-amino compounds such as aniline and nuclearly substituted anilines, such as toluidine, xylidine, etc. The reaction involved in the preparation of the alkenylarylamine by the condensation of a diolefinic hydrocarbon with an arylamine is usually conducted at a temperature within the range of from about 100° to about 150° C., although the conditions of preparation may vary in the case of certain reactants which require higher or lower reaction temperatures. Usually, an equimolecular proportion of the reactants is utilized in the preparation, since higher proportions of the diene in the reaction or additional quantities of the diene added subsequently to the formation of the monoalkenylarylamine contaminate the latter desired product with N,N'-dialkenylarylamine corresponding approximately to the excess of the diene added to the reaction mixture.

The reactant characterized herein as an organic compound containing a carbonyl radical selected from the group consisting of the aldehydes and ketones, which when contacted with the N-alkenylarylamine at reaction conditions forms the resinous product of this invention, may be selected from the large number of aldehydes and ketones comprising the aliphatic saturated or unsaturated compounds, either of straight- or branched-chain configuration, the aliphatic aldehyde polymers, and the cyclic members of the broad classification of carbonyl compounds, either of heterocyclic or homocyclic structure, including the aromatic, as well as naphthenic or saturated cyclic series. Polycarbonyl reactants or a mixture of one or more of aldehydes and/or ketones of the above classes may also be utilized in the condensation type of reaction. Typical examples of each of the above classes of aldehydes and ketones are given in the following table, although the compounds named in the table are not to be interpreted as restricting the scope of the invention to the specific members of each series named therein:

stituted hydrocarbon radicals selected from the group consisting of the halogen, hydroxyl, amino, and carboxyl radicals and $n$ is a small whole number equal to at least one. The corresponding structural formula for a substituted simple ketone is:

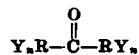

where R, Y and $n$ have the same designation as that specified above for the substituted aldehydes.

The reaction of the present process whereby a resinous product is formed is preferably effected in the presence of a catalytic substance of known capacity for catalyzing condensation reactions. Among said group of condensation catalysts the aromatic acids, such as benzoic acid or aliphatic acids such as glacial acetic or oxalic acid and various mineral acids, such as hydrochloric, sulfuric and phosphoric acids, are very effective in initiating and accelerating the condensation reaction of the present process. The catalyst may be subsequently removed from the resinous product by treating the latter with a solvent which selectively dissolves the acid from the resin, such as water, alcohols, etc. Although the condensation reaction here involved is preferably conducted in the presence of a catalyst of the above specified type, it is to be emphasized that catalytic agents are not necessarily required in all instances to effect a given condensation. Thus, certain N-alkenylarylamines, aldehydes and ketones, especially the unsaturated aliphatic and aromatic aldehydes and ketones containing unsaturated substituted or unsubstituted hydrocarbon radicals attached to the carbonyl group, are each capable of reacting in the absence of a specifically recognized catalytic agent to yield the

TABLE

*Carbonyl compounds utilizable as reactants*

|  | Aldehydes | Ketones |
|---|---|---|
| Aliphatic: |  |  |
|   Saturated | Formaldehyde, butyr-aldehyde | Acetone, methylethyl ketone. |
|   Unsaturated | Acrolein, crotonaldehyde | Methyl vinyl ketone, ethylidene acetone. |
|   Branched Chain | Isovaleraldehyde | Phorone, mesityl oxide. |
| Aliphatic Polymers | Paraformaldehyde |  |
| Homocyclic: |  |  |
|   Naphthenic (cyclic saturated) | Pentahydrobenzaldehyde | Cyclohexylacetone. |
|   Aromatic | Cinnamic aldehyde | Acetophenone. |
| Heterocyclic | Furfural | Cyclohexanone. |
| Polycarbonyl | Glyoxal | Benzoylacetone. |

The condensation reaction of the present process may also be obtained by the reaction of certain substituted derivatives of the carbonyl reactant to provide resinous products having modified properties differing in some respects from the products obtained by the condensation of the simple aldehydes and ketones. Thus, the carbonyl compound may contain as substitutents attached to carbon atoms other than the carbonyl group one or more of such radicals as halogen, particularly the chloro and bromo members of this group, hydroxyl, amino, and carboxyl. The substituted derivatives of the simple aldehydes and ketones may be represented structurally by the general formula:

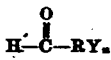

for the aldehydes, in which R is at least a substituted methyl group and is selected from the group of substituted hydrocarbon radicals consisting of alkyl, aryl, alkenyl, aralkyl and naphthene (cycloalkyl), Y is a substituent of said subpresent resinous product. In some instances, for example, the reactants may be mixed at room temperature or below in the entire absence of the catalyst and a reaction occurs, as evidenced by the spontaneous liberation of heat the progressive increase in the viscosity of the reaction mixture, and the formation of a distinct resinous product. The preferred procedure, however, is to employ a catalyst of the type specified above, since it has been observed that the catalyzed reaction proceeds at a more rapid rate and the product isolated from the reaction mixture is a material possessing more of the desired resinous properties of products of this type. Furthermore, it has been observed that it is not essential in most instances to heat the reaction mixture in order to initiate the condensation reaction. In utilizing the relatively reactive carbonyl compounds or N-alkenylarylamines as reactants, the condensation reaction may begin at comparatively low temperatures such as, for example, at room temperature or from about 25 to 30° C. by merely mixing the components in the absence of a catalyzing material, although in the case of other reactants, catalysts may be added to the reaction mixture or the mixture of reactants may be heated to somewhat higher temperatures up to about 200° C. to initiate the condensation reaction or complete the condensation of partially reacted starting materials.

The product formed in the initial condensation may be isolated by neutralization of the acid catalyst, by mixing, for example, the product with an aqueous alkali solution or by the addition of water to the reaction mixture, thereby coagulating the resinous product.

It is also within the scope of the present invention to carry out the reaction in the presence of a solvent which is miscible with the reactants and/or the resultant resinous product. The solvent, for example, may be selected from the low molecular weight hydrocarbons, such as hexane, petroleum ether, etc., the halogen substituted hydrocarbons, such as chloroform, etc., and the lower alcohols and ethers such as ethanol, butanol, diethyl ether, etc. The solvent and catalyst functions may be combined in a single compound, such as acetic acid, oxalic acid, etc. The solvent may thereafter be removed from the product by washing with a secondary solvent miscible with the primary solvent or by evaporating the solvent from the product resin. In many cases it is desirable to employ the solvent as a diluent of the reactants so as to control the rate of reaction or the temperature developed in the reaction mixture, for example, by refluxing the solvent. When such precautions are taken, the product usually has a more desirable color and other physical properties are improved such as hardness etc.

After completion of the initial condensation reaction and the separation of the product from the reaction mixture, the product may be dried and pulverized into a finely divided form suitable for subsequent molding operations, mixing into plastics or protective covering compositions, or for storage, as desired. The resinous product formed in the initial reaction may be further reacted with additional quantities of either the same or a different carbonyl compound than the aldehyde or ketone employed in the initial reaction, to form thereby a fully reacted condensation product which is usually harder and more refractory than the initial partial condensation product. In general, the utilization of an excess of the N-alkenylarylamine, for example a ratio thereof to the aldehyde greater than a 2:1 molecular ratio, results in the production of a softer resinous product. As the proportion of aldehyde to amine increases in the initial reaction mixture, the resultant product tends to be progressively harder and tougher, so that a condensate initially formed from a mixture of reactants containing less aldehyde than the 2:1 ratio of amine to aldehyde may be subsequently hardened by further incorporating into the initial reaction product additional aldehyde and thereafter reacting the latter mixture to form the hardened product.

The N-alkenylarylamine-aldehyde and/or ketone condensation products formed according to the present process are usually resinous, varying in hardness from soft, pliable masses to hard solids which may be tough or brittle, depending upon the reactants and vary in lustre from solids having a glossy surface to dull, lustreless resins. The physical properties of the product depend principally upon the reactants utilized and their effect on the molecular weight of the product as well as the use of a catalyst in the reaction.

The products have a widespread utility in various arts, depending in a large measure upon the physical properties of the resin. Since the present products have unsaturated linkages in their molecular structure, they may be incorporated into drying oils and as such are also subject to polymerization and oxidation reactions which take place during the so-called "drying" process. When compounded with other drying oils of the glyceride type, for example, certain of the present resins, especially the solid resinous products, give valuable film-forming and bodying properties to paints and varnishes in which these resins are incorporated. Varnishes are obtained from these products which dry quickly and completely and yield a glossy surface resistant to chemicals, water and abrasive agents. In some cases the present products are valuable vulcanization accelerators, and others, when incorporated into synthetic or natural rubbers, retard the deterioration and oxidation of the rubber composition. In addition to their value as additives in other compositions, the present products are in some cases valuable as resins per se in forming molded and extruded articles or for impregnation of cellulosic materials such as wood chips, cotton linters, or other fibrous materials to form semi-rigid structural shapes.

The following examples are presented for the purposes of illustrating the present process in some of its specific applications, but should not be construed as restricting the generally broad scope of the invention, either as to the reacting components or as to the reaction conditions.

EXAMPLE I

N-butenylaniline was prepared by the condensation of butadiene with aniline. For the purpose of preparation, 400 ml. of aniline (4.8 mols) and 20 grams of metallic sodium were heated to a temperature of 120° C. under pressure. Into this mixture, which was stirred as the reaction proceeded, 400 ml. of butadiene (4.2 mols) was added. The mixture was stirred for 18 hours at the above temperature, resulting in an almost quantitative yield of N-butenylaniline.

The above N-butenylaniline was utilized in the following examples to prepare the resins hereinafter described, although it is to be emphasized that other N-alkenylarylamines may be prepared, such as alkenyl derivatives prepared from aromatic amines other than aniline, and other diolefins of higher molecular weight than butadiene; thus, the N-alkenylarylamine may be prepared from such compounds as toluidine and such diolefins, as pentadiene, to yield the corresponding N-pentenyltoluidine.

A reddish colored solid resin was obtained by the condensation of N-butenylaniline, prepared as above, with para-formaldehyde. 14.7 grams of N-butenylaniline (0.1 mol) was mixed with 3.0 grams of para-formaldehyde (0.1 mol equivalent of formaldehyde) in 25 ml. of glacial acetic acid and the mixture heated gently to about 40° C. A vigorous reaction occurred and a reddish colored solution of the resin in glacial acetic acid was formed. The resin was isolated by diluting the reaction mixture with water, thereby causing a coagulation of the resin which separated as a solid product in fine particles.

EXAMPLE II 5.6 grams of acrolein (0.1 mol) was mixed with 14.7 grams of N-butenylaniline (0.1 mol). The mixture reacted spontaneously without the addition of heat yielding a viscous condensation product.

A similar mixture in the same molecular proportions was reacted in the presence of an acid catalyst to yield a hard brittle resin; 14.7 grams of N-butenylaniline was mixed with 2 cc. of 10 N. hydrochloric acid and the mixture was added to 5.6 grams of acrolein. The mixture reacted vigorously on each addition of the reactants and liberated considerable heat so that cooling was necessary. The final product was added to water to recover a hard brittle resin.

EXAMPLE III

A condensation product of furfuraldehyde and N-butenylaniline was prepared by adding 9.60 grams (0.1 mol) of furfural to a mixture of 0.5 gram oxalic acid and 14.7 grams N-butenylaniline, the reactants combining vigorously with the spontaneous generation of heat. The resultant resin was poured while molten onto a cool surface and rapidly solidified to a hard glossy resinous product.

EXAMPLE IV

A resinous condensation product is formed by reacting 16.1 grams (0.1 mol) of N-pentenylaniline and 13.8 grams (0.1 mol) of phorone at a temperature of approximately 40° C., 0.5 gram of oxalic acid being added to the mixture as catalyst. The reaction is spontaneous and the mixture is cooled to maintain the temperature at approximately the above value. The resinous product is a hard thermoplastic material.

I claim as my invention:

1. A process for the production of a resinous product which comprises reacting an N-alkenylarylamine containing an alkenyl group of at least 4 carbon atoms with a carbonyl compound selected from the group consisting of the aldehydes, and ketones.

2. The process of claim 1 further characterized in that said carbonyl compound is reacted with said N-alkenylarylamine in the presence of an acidic condensation catalyst.

3. A process for the production of a resinous product which comprises reacting an N-alkenylarylamine containing an alkenyl group of at least 4 carbon atoms and of the general formula: $C_nH_{2n-1}$ with a carbonyl compound selected from the group consisting of the aldehydes, and ketones in the presence of acetic acid.

4. A process for the production of a resinous product which comprises reacting one molecular proportion of an N-alkenylarylamine containing an alkenyl group of at least 4 carbon atoms and of the general formula: $C_nH_{2n-1}$ with an equimolecular proportion of a carbonyl compound selected from the group consisting of the aldehydes, and ketones in the presence of an acetic acid catalyst.

5. The process of claim 4 further characterized in that said N-alkenylarylamine is N-butenylaniline.

6. A process for the production of a resinous product which comprises reacting one molecular proportion of N-butenylaniline with one molecular proportion of acrolein in the presence of glacial acetic acid to form said resinous product.

7. A process for the production of a resinous product which comprises reacting a carbonyl compound selected from the group consisting of the aldehydes and ketones with an N-alkenylarylamine containing an alkenyl group of at least 4 carbon atoms and of the general formula: $C_nH_{2n-1}$ and after the resulting action is substantially complete, isolating said resinous product by mixing the reaction product in water and isolating the resin from the resulting aqueous phase.

8. A resinous material comprising the reaction product of a carbonyl compound selected from the group consisting of the aldehydes and ketones with N-butenylaniline.

9. A resinous material comprising the reaction product of a carbonyl compound selected from the group consisting of the aldehydes and ketones with an N-alkenylarylamine having an alkenyl group of the general formula: $C_nH_{2n-1}$ and containing at least 4 carbon atoms per group.

10. A process for manufacturing a resinous product which comprises reacting an aliphatic aldehyde with an N-alkenylarylamine having an alkenyl group of at least 4 carbon atoms and of the general formula $C_nH_{2n-1}$.

11. A process for manufacturing a resinous product which comprises reacting one molecular proportion of N-butenylaniline with an aldehyde in the presence of glacial acetic acid.

12. A process for manufacturing a resinous product which comprises reacting an N-butenylarylamine with a saturated aliphatic aldehyde.

13. A process for manufacturing a resinous product which comprises reacting an N-butenylaniline with a saturated aliphatic aldehyde.

14. A process for manufacturing a resinous product which comprises reacting an N-butenylarylamine with a saturated aliphatic aldehyde in the presence of an acid condensing agent.

15. A process for manufacturing a resinous product which comprises reacting an N-butenylaniline with a saturated aliphatic aldehyde in the presence of an acid condensing agent.

16. A process for preparing a resinous product which comprises reacting an N-butenylaniline with para-formaldehyde in the presence of glacial acetic acid.

17. A resinous material which comprises the reaction product of an N-butenylarylamine with a saturated aliphatic aldehyde.

18. A resinous material which comprises the reaction product of an N-butenylaniline and a saturated aliphatic aldehyde.

19. A resinous material which comprises the reaction product of an N-butenylaniline and para-formaldehyde.

20. A resinous material comprising the reaction product of an aldehyde with an N-butenylarylamine.

21. A process for manufacturing a resinous product which comprises reacting an aldehyde with an N-alkenylarylamine having an alkenyl group of the general formula $C_nH_{2n-1}$ and containing at least four carbon atoms.

22. A resinous material comprising the reaction product of an aldehyde with an N-alkenylarylamine having an alkenyl group of the general formula $C_nH_{2n-1}$ and containing at least four carbon atoms.

JOSEPH D. DANFORTH.

No references cited.